3,666,539
HIGH TEMPERATURE CURING THERMOSETTING DECORATIVE COMPOSITION
Robert H. Kiel, deceased, late of Weston, Ohio, by Jessie H. Kiel, administratrix, Weston, Ohio, assignor to Owens-Illinois, Inc.
No Drawing. Continuation of application Ser. No. 688,697, Dec. 7, 1967, which is a continuation-in-part of applications Ser. No. 489,734, Sept. 23, 1965, and Ser. No. 571,986, Aug. 12, 1966. This application Apr. 20, 1970, Ser. No. 28,260
Int. Cl. C03c 17/30
U.S. Cl. 117—124 F
16 Claims

ABSTRACT OF THE DISCLOSURE

This invention relates to the preparation of a novel organic thermosetting resin base decorative composition having increased permanency of adhesion to a glass surface and capable of being cured at elevated temperatures up to about 2000° F. without browning or degrading thereof, said composition consisting essentially of approximately stoichiometric proportions of at least one carboxyl functional acrylic resin and at least one hydroxyl containing epoxy resin, and an ambifunctional, epoxy reactive silane present in an amount sufficient to substantially improve the permanency of adhesion of the composition to a glass surface. A further advantage of this invention is that the composition can be conveniently mixed and stored in one container until used.

RELATED APPLICATIONS

This invention is a continuation of copending U.S. patent application No. 688,697, filed Dec. 7, 1967 which is a continuation-in-part of copending U.S. patent applications Nos. 489,734 and 571,986, filed respectively on Sept. 23, 1965 and Aug. 12, 1966, all now abandoned.

THE INVENTION

This invention relates to a novel process and decorative composition whereby a suitable surface, particularly a glass surface such as a glass container, e.g. bottles, ware, tumblers, and the like, is decorated with a composition having increased permanency of adhesion and capable of being rapidly cured at elevated temperatures up to about 2000° F. which would darken or degrade ordinary resin-based compositions.

More particularly, in accordance with the practice of this invention, there is provided a novel one-container, organic, thermosetting, resin-base, decorative composition consisting essentially of approximate stoichiometric proportions of at least one carboxyl functional acrylic resin and at least one hydroxyl containing epoxy resin, and a small effective amount of an ambifunctional, epoxy reactive silane.

In the prior art, thermosetting compositions have been prepared utilizing epoxide and acrylic polymers. However, such compositions have been directed to the use of basic epoxy-curing catalysts, low temperatures, and relatively long curing periods, e.g. as disclosed in U.S. Letters Patent 3,305,601.

The instant invention has distinct advantages over such prior art compositions by utilizing a one-can system which can be applied to a decorable surface, e.g. a glass container surface, and rapidly cured at elevated temperatures without browning or degrading of the composition in the absence of a basic-epoxy curing catalyst. Thus, in accordance with this invention, a high speed printing technique can be used, e.g. such as offset printing, to apply an organic base composition to a greater number of decorable items per unit time. Such high speed decorating has not been possible with low temperature curing organic compositions; that is, such compositions have not been used where economy is essential, e.g. in the decorating of high production, low cost items such as glassware, bottles, etcetera.

Likewise, the novel composition of this invention has the important advantage of exhibiting increased permanency of adhesion under adverse conditions relative to such prior art compositions.

In the practice of this invention there is used approximate stoichiometric proportions of any compatible hydroxy containing epoxy resin(s) and carboxyl functional acrylic resin(s) in combination with the ambifunctional, epoxy reactive silane.

In addition, it is further contemplated that other compatible decorative coating or ink forming ingredients may be used such as fillers, pigments, solvents, wetting or dispersing agents, waxes, etcetera.

Epoxy or epoxide resins are characterized by having reactive epoxide groups

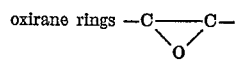

in the resin structure and are commonly available in both liquid and solid form. As used herein the term "epoxy resin" is to be considered inclusive of any hydroxyl containing epoxy resin whether in the liquid or solid state.

Typical hydroxy containing epoxy resins contemplated herein include diglycidyl ether or bisphenol A (and its homologues), glycidyl ethers of glycerol, glycidyl ethers of bisphenol F, glycidyl ethers of a long chain bisphenol, glycidyl ethers of tetrakis (hydroxyphenyl) ethane, and epoxylated novolacs. In addition the epoxy resins described and set forth in the aforementioned parent patent applications of Robert H. Kiel, are incorporated herein by reference. Likewise, those resins given in the publication epoxylated novolacs. In addition the epoxy resins described Hill Book Co., Inc., (1957) and U.S. Letters Patent 3,305,601 (and the references cited therein) are also incorporated herein by reference.

Many commercially available epoxy resins are available including the so-called Epon resins.

Epon is a registered trademark designating various epoxy resins available from the Shell Chemical Company, Plastics and Resins Division, 110 W. 51st St., New York 20, N.Y.

The Epon 1001, 1007, 820 and 828 are representative epichlorohydrin/bisphenol A-type liquid and solid epoxy resins. All possess hydroxyl groups and terminal epoxide groups. The primary difference among the various types is the molecular weight which increases as the identifying number increases.

The chemical structure of a typical molecule of the base resin of Epon 1001, 1007, 820 and 828 is represented by

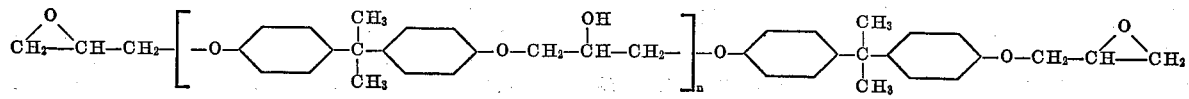

The properties of these selected Epon resins are set forth hereinafter in Table I.

TABLE I.—EPON RESINS

| | Epon 1001 | Epon 1007 | Epon 820 |
|---|---|---|---|
| Melting point, ° C | 65–75 | 125–135 | Liquid-room temperature. |
| Weight per gallon, lbs., 20° C. | 9.9 (void-free). | 9.6 (void-free). | 9.7. |
| Refractive index, 25° C | 1.595 | 1.598 (20° C.) | 1.565–1.575. |
| Average molecular weight | 900 | 2,900 | 350. |
| Color,[1] 25° C., (Gardner) | 4 max | 5 max | 8 max. |
| Viscosity,[2] 25° C.: | | | |
| Gardner-Holdt | D–G | y–z | |
| Poise | 1.0–1.7 | 18–28 | 40–100. |
| Epoxide equivalent [3] | 450–550 | 2,000–2,500 | 180–195. |
| Equivalent weight [4] | 145 | 200 | 85. |
| Hydroxyl content [5] | 0.28 | 0.36 | 0.06. |

[1] Using ASTM D1544–58T.
[2] Bubble-tube method, ASTM 154D, for Epon 1001 and 1007; kinematic viscosity, ASTM D445–53T, for Epon 820.
[3] Grams of resin containing one gram-equivalent of epoxide; a-epoxy group content, ASTM D1652–59T.
[4] Grams of resin required to esterify completely one gram-mole of mono-basic acid; e.g. 280 grams of C₁₈ fatty acid or 60 grams of acetic acid.
[5] Equivalent OH/100 grams resin.

The acrylic resin used herein is a copolymer of an acrylic acid having the formula

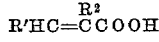

where R' and R² are the same or different members selected from hydrogen and alkyl radicals of less than 9 carbons, which is copolymerized by addition polymerization with at least one polymerizable ethylenically unsaturated monomer selected from vinyl aromatic compounds free of substituents capable of reacting with a carboxylic acid group, esters of saturated alcohols containing 1 to 20 carbon atoms, and the same or different acrylic acid as defined hereinbefore.

Examples of acrylic resins which may be used herein are disclosed in U.S. Letters Patents 2,931,742 and 3,305,601 and Reissue Letters Patent 25,993.

The acrylic and epoxy resins are used in approximate stoichiometric proportions, e.g. 80 to 120 percent of the theoretical stoichiometric proportion or molar ratio.

In the practice of this invention, there is used an epoxy reactive, ambifunctional silane in an amount sufficient to increase the permanency of adhesion and the caustic resistance of the decorative composition, especially when the composition is applied to a glass surface, e.g. as a decorative ink.

It has been known in the art that amino containing silanes can be used to increase the permanency of adhesion of decorative coatings for glass. However, many of such amino silanes cannot be added to the coating composition until shortly before the use of the coating since the amine group typically causes the epoxy vehicle to gel within a very short period of time. Accordingly, it has not been possible to use many of the amine functional silanes in one-can decorating epoxy-resin based compositions.

However, it has been discovered in the practice of this invention that a one-can formulation is possible with certain epoxy reactive, ambifunctional silanes; that is, the addition of such silanes to the composition makes it possible to premix the coating composition for a reasonably long period of time prior to use.

Likewise, the permanency of adhesion of the coating composition to the glass surface is substantially enhanced relative to other coatings when soaked in water or hot caustic for prolonged periods of time. Thus, the use of an epoxy reactive ambifunctional silane in accordance with this invention provides a decorative glass coating which typically exhibits permanency of adhesion to a glass surface when soaked in a 3 percent by weight aqueous NaOH solution at 160° F. for a relatively short period of time or when soaked in water at 72° F. for several months. Such permanency of adhesion may be readily tested and observed by applying a layer of adhesive tape to a coated glass surface which has been soaked in NaOH solution or hot water.

In this invention, there is used an epoxy reactive, ambifunctional silane compound(s) having the structural formula:

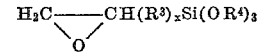

wherein R³ is selected from divalent hydrocarbon radicals of less than 10 carbon atoms and divalent hydrocarbon radicals of less than 10 carbon atoms containing oxygen atoms, at least one oxygen atom being in the form of ether linkages, and wherein x has a value of either 0 or 1, and R⁴ is selected from the same or different members of the group consisting of hydrogen and aliphatic hydrocarbon radicals of less than 5 carbon atoms (methyl ethyl, propyl, and butyl). In order to have a stable epoxy compound, preferably at least two of the R⁴ groups should be selected from aliphatic hydrocarbon radicals.

In accordance with one preferred embodiment of this invention, the epoxy reactive silane is a glycidoxypropyltrialkoxysilane represented by the structural formula:

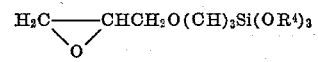

where R⁴ is selected from hydrogen and an aliphatic hydrocarbon radical of less than 5 carbon atoms.

The ambifunctional silane is used in an amount sufficient to substantially increase the permanency of adhesion of the coating composition to the particular glass surface, usually a small effective amount of about 1 to 10 parts by weight of silane per 100 parts by weight of the resins.

The pigments or fillers contemplated in the practice of this invention may be colored, colorless, inorganic, or organic.

Generally the inorganic pigments include alumina hydrate, barium sulfate, chrome green, iron blues, lithopones, vermillion, white lead, and metal oxides such as zirconium oxide, titanium dioxide, zinc oxide and the like.

When the pigment is a metal oxide, it is especially desirable if it is prepared by a vapor phase decomposition technique, such as the vapor phase decomposition of a titanium halide in the presence of an oxidizing or hydrolyzing agent to produce titanium oxide. If titanium oxide is used as the pigment, it is preferred to use the rutile form as distinguished from the anatase.

Organic pigments that are satisfactory for the instant coating may be chemically classified as the nitro, the azo and diazo, the nitroso and isonitroso, the oxyketone, the ketonimides and hydrazides, the azines, the quinolines, the acridine, the indanthrene and the phthalocyanine colors. Examples of organic pigments include anthosine, benzidine yellow, eosine, rose bengal, Hanse yellow, lithol red, methyl red, and peacock blue.

Although the concentration of the pigment(s) will, of course, be dependent on the color desired and the nature of the pigment, typically the pigment(s) is present in a concentration range of about 5 to 75 percent by weight.

Likewise, known low temperature catalysts such as certain of the carbonates may be used as pigments or fillers herein even though such are not intended nor required for the curing of the composition. However, if certain catalysts such as the triphenylamines are used as organic pigment, such may cause gellation and thereby prevent the use of a one-container formulation.

Suitable solvents which can be used in the ink formulations include methylethyl ketone, methyl isobutyl ketone, diacetone alcohol, n-butyl acetate, ethylene glycol monoethyl ether, ethylene glycol monomethyl ether, ethylene glycol monobutyl ether, diethylene glycol monoethyl ether, diethylene monomethyl ether, diethylene glycol monobutyl ether, ethylene glycol monoethyl ether acetate, toluene, xylene, benzene trichloropropane, chloroform, isophorone, allkyl Cellosolve such as butyl Cellosolve including mixtures of same such as mixtures of toluene-isopropyl alcohol, mixtures of toluene-sec butyl alcohol, mixtures of toluene with 4-methyl-2-pentanal and the like.

In a preferred embodiment of this invention, the solvent is non-aromatic and is an aliphatic or heterocyclic solvent, such as butyl cellosolve.

Suitable wetting and/or dispersing agents contemplated herein include lecithins, mixed fatty acid esters of phosphatidyl choline, polyethylene sorbital oleate eaurate, sodium oetylsulfate, polyethylene glycol lauryl ether, and diethylene glycol monostearate.

In the practice of this invention, the addition of wax(es) to the decorative composition has various beneficial results. Thus, for example, the addition of a dispersed polyethylene wax will substantially increase the carton abrasion resistance of the composition when applied to a glass surface e.g. a glass container surface.

In accordance with the practice of this invention, the novel compositions are typically applied to a suitable surface such as a glass substrate and quickly cured at elevated temperatures without degrading the organic resins. Thus, in the practice of this invention, the novel resin-base compositions hereof can be heated and cured at temperatures of about 2000° F. within only a few seconds, e.g. about 350° F. to about 2000° F. for about 20 minutes to about 5 seconds.

Typically the compositions hereof are cured at about 375° F. to about 1000° F. for about 10 minutes to about 1 minute.

Examples I and II hereinafter represent some of the best modes contemplated by the inventors in the practice of this invention.

EXAMPLE I

A carboxyl functional acrylic resin is prepared by adding 15 parts by weight styrene, 25 parts of weight butyl methacrylate, 10 parts by weight acrylic acid, and 2 parts by weight benzoyl peroxide to a one liter kettle containing 50 parts by weight butyl Cellosolve solvent, the kettle and solvent having previously been purged with nitrogen for 15 minutes.

The temperature is gradually increased to about 90° C. over a two hour period and maintained at 90° C. for about six hours at which time the reaction is discontinued. The nitrogen purge is maintained throughout the reaction.

The finished acrylic resin has a solids content of about 54.5 percent by weight and an acid number equal to 74 milligrams of KOH per gram of sample.

EXAMPLE II

A composition consisting of 100.0 parts by weight Epon 1001, 185.0 parts by weight of the acrylic resin prepared in Example I, 285.0 parts by weight rutile $TiO_2$, and 6.0 parts by weight glycidoxypropyltrimethoxysilane is prepared and 7.86 parts by weight of polyethylene wax(es) dispersed therein. The resulting composition is then milled on a three roll mill.

A portion of the composition is applied as a coating to two identical soda lime glass substrates and cured at 570° F. for 45 seconds.

Another portion of the composition is applied as a coating to two soda lime glass substrates (identical to those used above) and cured at 800° F. for 10 to 15 seconds.

Glossy, carton abrasion resistant films are obtained.

A specimen of a substrate cured at 570° F. and a specimen of a substrate cured at 800° F. are soaked in water at 75° F.

The other specimen cured at 570° F. and the other specimen cured at 800° F. are soaked in 3% by weight NaOH at 160° F.

Periodically the specimens are recovered from the water and NaOH baths are tested by means of an adhesive tape applied to the coated glass surface.

After two months of continuous water soaking, each coating still adheres permanently to its respective glass surface with no detectable amount being noted on the applied adhesive tape.

In addition, each film tested in NaOH exhibits good caustic resistance by adhering permanently to its respective glass substrate after soaking in a 3% NaOH solution at 160° F. for 30 minutes.

Although this invention has been illustrated and described hereinbefore with reference to certain specific details and embodiments, it will be readily apparent to those skilled in the art that other embodiments and modifications hereof can be made within the scope and spirit of the invention.

What is claimed is:

1. A process for decorating a glass surface which comprises coating the surface with a thermosetting, organic resin based composition consisting essentially of at least one carboxyl functional acrylic resin which is a copolymer of an acrylic acid having the formula

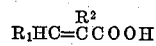

where $R^1$ and $R^2$ are the same or different members selected from hydrogen and alkyl radicals of less than 9 carbons, which is copolymerized by additional polymerization with at least one polymerizable ethylenically unsaturated monomer selected from vinyl aromatic compounds free of substituents capable of reacting with a carboxylic acid group, esters of saturated alcohols containing 1 to 20 carbon atoms, and the same or different acrylic acid as defined hereinbefore, and at least one hydroxyl containing epoxy resin, the acrylic and epoxy resins being used in approximate stoichiometric proportions of 80 to 120 percent of molar ratio, and at least one ambifunctional, epoxy reactive silane present in an amount sufficient to substantially improve the permanency of adhesion of the composition to the glass, said silane having the structural formula:

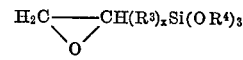

wherein $R^3$ is selected from divalent hydrocarbon radicals of less than 10 carbon atoms and divalent hydrocarbon radicals of less than 10 carbon atoms containing oxygen atoms, at least one oxygen atom being in the form of ether linkages, and wherein $x$ has a value of either 0 or 1, and $R^4$ is selected from the same or different members of the group consisting of hydrogen and aliphatic hydrocarbon radicals of less than 5 carbon atoms, and then thermally curing the composition in the absence of a basic epoxy-resin curing catalyst at a high elevated temperature relative to the curing temperature of a catalyst containing composition.

2. The process of claim 1 wherein the composition is cured at a temperature of about 350° F. to about 2000° F. for about 20 minutes to about 5 seconds.

3. The process of claim 1 wherein the composition is cured at a temperature of about 375° F. to about 1000° F. for about 10 minutes to about 1 minute.

4. The process of claim 3 wherein the composition contains other compatible ingredients selected from suitable pigments or fillers, solvents, and a dispersed polyethylene wax.

5. The process of claim 4 wherein the pigment is rutile $TiO_2$.

6. The process of claim 1 wherein the silane is a glycidoxypropyltrialkoxysilane.

7. An article of manufacture comprising in combination a glass substrate having at least one surface thereof decorated with an organic-resin based coating consisting essentially of at least one carboxyl functional acrylic resin which is a copolymer of an acrylic acid having the formula

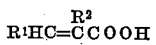

where $R^1$ and $R^2$ are the same or different members selected from hydrogen and alkyl radicals of less than 9 carbons, which is copolymerized by additional polymerization with at least one polymerizable ethylenically unsaturated monomer selected from vinyl aromatic compounds free of substituents capable of reacting with a carboxylic acid group, esters of saturated alcohols containing 1 to 20 carbon atoms, and the same or different acrylic acid as defined hereinbefore, and at least one hydroxyl containing epoxy resin, the acrylic and epoxy resins being used in approximate stoichiometric proportions of 80 to 120 percent of molar ratio, and at least one ambifunctional, epoxy reactive silane present in an amount sufficient to substantially improve the permanency of adhesion of the coating to the glass, said silane having the structural formula:

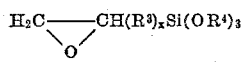

wherein $R^3$ is selected from divalent hydrocarbon radicals of less than 10 carbon atoms and divalent hydrocarbon radicals of less than 10 carbon atoms containing oxygen atoms, at least one oxygen atom being in the form of ether linkages, and wherein $x$ has a value of either 0 to 1, and $R^4$ is selected from the same or different members of the group consisting of hydrogen and aliphatic hydrocarbon radicals of less than 5 carbon atoms.

8. The article of claim 7 wherein the silane is a glycidoxypropyltrialkoxysilane.

9. The process of claim 1 wherein the epoxy reactive silane is a glycidoxypropyltrialkoxysilane having the structural formula

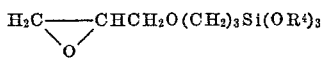

wherein $R^4$ is selected from hydrogen and an aliphatic hydrocarbon radical of less than 5 carbon atoms.

10. The process of claim 9 wherein the silane is glycidoxypropyltrimethoxysilane.

11. The article of claim 7 wherein the epoxy reactive silane is a glycidoxypropyltrialkoxysilane having the structural formula

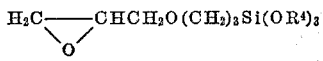

wherein $R^4$ is selected from hydrogen and an aliphatic hydrocarbon radical of less than 5 carbon atoms.

12. The article of claim 11 wherein the silane is glycidoxypropyltrimethoxysilane.

13. The article of claim 11 wherein at least two of the $R^4$ groups are selected from aliphatic hydrocarbon radicals.

14. The article of claim 8 wherein there is present about 1 to about 10 parts by weight of silane per 100 parts by weight of resins.

15. The article of claim 14 wherein there is present about 1 to about 10 parts by weight of silane per 100 parts by weight of resins.

16. An article of manufacture comprising in combination a glass substrate having at least one surface thereof decorated with an organic resin-based coating, said coating being the cured form of a composition consisting essentially of at least one carboxyl functional acrylic resin which is a copolymer of an acrylic acid having the formula

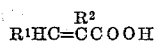

where $R^1$ and $R^2$ are the same or different members selected from hydrogen and alkyl radicals of less than 9 carbons, which is copolymerized by additional polymerization with at least one polymerizable ethylenically unsaturated monomer selected from vinyl aromatic compounds free of substituents capable of reacting with a carboxylic acid group, esters of saturated alcohols containing 1 to 20 carbon atoms, and the same or different acrylic acid as defined hereinbefore, and at least one hydroxyl containing epoxy resin, the acrylic and epoxy resins being used in approximate stoichiometric proportions of 80 to 120 percent of molar ratio, and at least one ambifunctional, epoxy reactive silane present in an amount sufficient to substantially improve the permanency of adhesion of the coating to the glass, said silane having the structural formula:

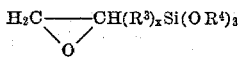

wherein $R^3$ is selected from divalent hydrocarbon radicals of less than 10 carbon atoms and divalent hydrocarbon radicals of less than 10 carbon atoms containing oxygen atoms, at least one oxygen atom being in the form of ether linkages, and wherein $x$ has a value of either 0 or 1, and $R^4$ is selected from the same or different members of the group consisting of hydrogen and aliphatic hydrocarbon radicals of less than 5 carbon atoms.

References Cited

UNITED STATES PATENTS

| | | | |
|---|---|---|---|
| 3,014,607 | 12/1961 | Barnby et al. | 117—124 F |
| 3,220,878 | 11/1965 | Pines | 117—124 F |
| 3,285,802 | 11/1966 | Smith et al. | 117—124 F |
| 3,425,974 | 2/1969 | Semroe | 17—124 F |

RALPH S. KENDALL, Primary Examiner

U.S. Cl. X.R.

117—161 ZA; 260—824 EP